3,089,827
PROCESS FOR PREPARING ZYGOMYCINS
Kôiti Nakazawa, Amagasaki, Motoo Shibata, Toyonaka, Eiji Higashide and Toshihiko Kanzaki, Nishinomiya, Hiroichi Yamamoto, Higashinada-ku, Kobe, Akira Miyake, Nishinomiya, Hiromu Hitomi, Ibaraki, Satoshi Horii, Kamigyo-ku, Kyoto, Takeshi Yamaguchi and Toyoshige Araki, Toyonaka, Kanji Tsuchiya, Neyagawa, Yuushi Oka, Higashiyodogawa-ki, Osaka, and Akihiro Imai, Higashisumiyoshi-ku, Osaka, Japan, assignors to Takeda Pharmaceutical Industries, Ltd., Osaka, Japan
Filed July 18, 1960, Ser. No. 43,469
Claims priority, application Japan July 24, 1959
6 Claims. (Cl. 195—80)

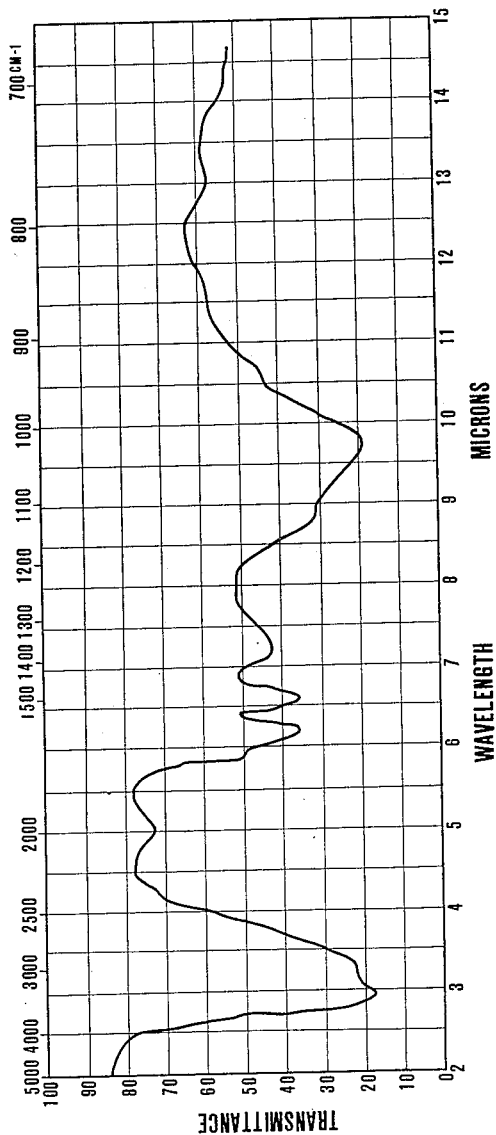

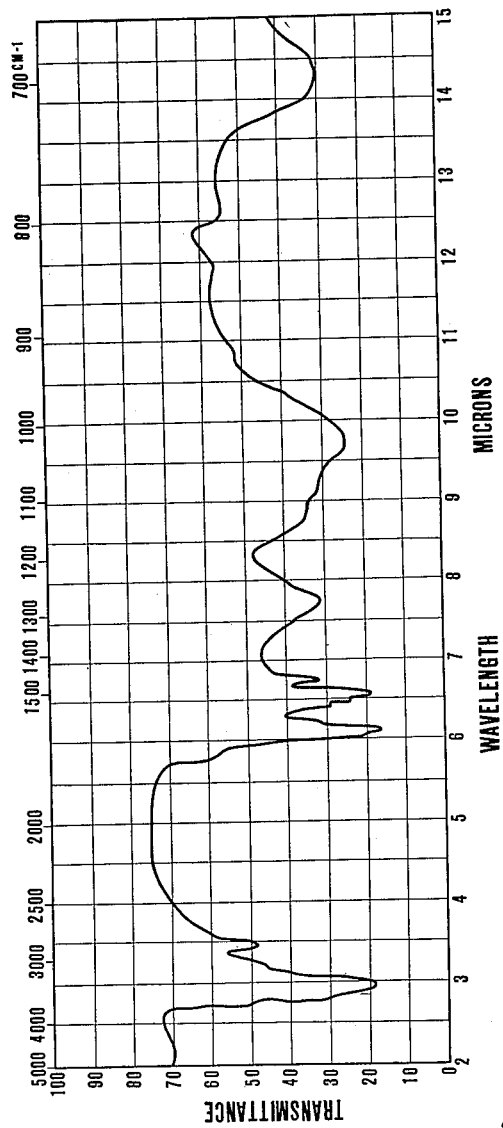

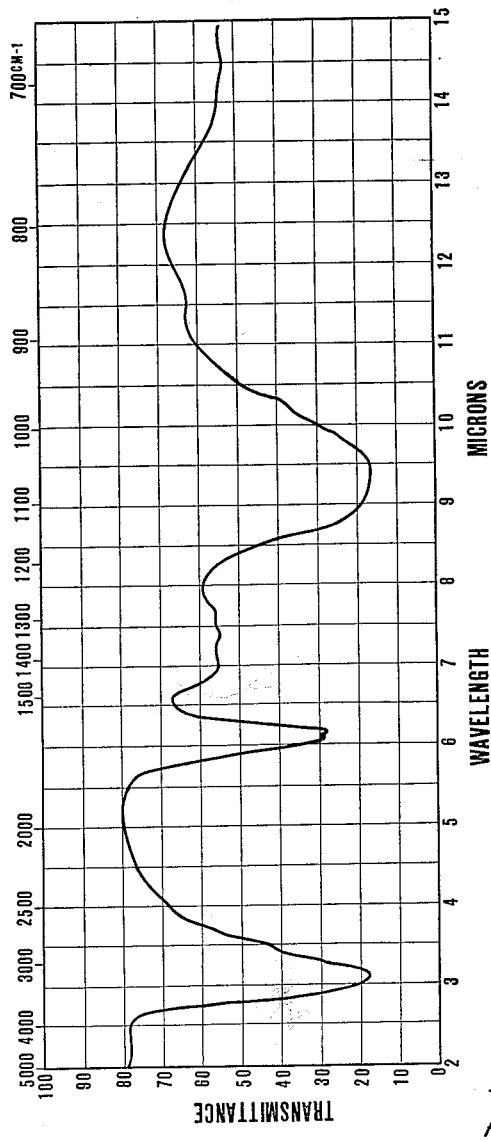

This invention relates to novel and antibiotically active compounds and to their production. More particularly, this invention relates to a group of antibiotics named zygomycin A, zygomycin B, zygomycin C and zygomycin D, respectively (these are inclusively referred to as "zygomycins," hereinafter). These novel antibiotics were isolated by the present inventors from a culture of a microorganism which was first separated from a sample of soil collected in Fukuchiyama City, Japan, and tentatively designated as "Strain No. 45449." From this strain various mutants having ability to produce these antibiotics have been derived. It has been concluded by the present inventors, from the taxonomical study of the strain, that there is no species under which the strain just falls, although it apparently belongs to the genus Streptomyces. Accordingly, this invention obviously reltes to novel antibiotics produced by a microorganism belonging to a novel Streptomyces species.

One of the new antibiotics, zygomycin A, was studied in detail on its physical and chemical properties, though its chemical structure has not been completely clarified. While another new antibiotic, zygomycin B, has come to be recognized as a compound resembling streptomycin. On other new antibiotics, zygomycin C and zygomycin D, their physical and chemical studies have not yet been made in detail.

Antimicrobial spectra of zygomycin A, zygomycin B, zygomycin C and zygomycin D show that they have antibiotic activities against a wide variety of microorganisms. As it has also been found that these antibiotics have strong antimicrobial activities, even in a living body, against such microorganisms listed in the antimicrobial spectra, and that these antibiotics have considerably low toxicity, these could be used for the treatment of diseases caused by such microorganisms.

The object of this invention lies in the production of zygomycin A, zygomycin B, zygomycin C and zygomycin D and can be achieved by cultivating a microorganism called Strain No. 45449 or its mutants.

The morphological and cultural characteristics of Strain No. 45449 are as shown in the following. In the description, the colour names marked with "Rdg." are based on "Ridgway's Colour Standards and Nomenclature."

(a) Morphological characteristics:
Vegetative growth: Yellow.
Aerial mycelium: Fairly abundant, white becoming Drab gray. Sporophores produce spirals.
Spores ellipsoidal to cylindrical, 0.6—0.8μ×0.8—1.6μ.

(b) Culture characteristics:
Czapeck's agar:
Growth: Colorless becoming Pale orange yellow (Rdg. III, 17–f), thin, spreading.
Aerial mycelium: Powdery, white later becoming Pallid mouse gray (Rdg. LI, 15''''''–f) to Light mouse gray (Rdg. LI, 15''''''–b).
Soluble pigment: None.
Reverse: Colorless to Warm buff (Rdg. XV, 17'–d).

Glucose asparagine agar:
Growth: Smooth, thin, spreading Zinc orange (Rdg. XV, 13'–o).
Aerial mycelium: Fairly abunant, white later becoming Drab gray (Rdg. XLVI, 17'''''–d) to Light drab (Rdg. XLVI, 17'''''–b).
Soluble pigment: Cinnamon (Rdg. XXIX, 15'').
Reverse: Zinc orange (Rdg. XV, 13'–o).

Bouillon agar:
Growth: Colorless, spreading, wrinkled.
Aerial mycelium: None or very scant, white later Drab gray (Rdg. XLVI, 17'''''–d).
Soluble pigment: None.
Reverse: Colorless.

Bouillon broth:
Medium clear, colour of medium not changed.
Colorless growth sinks to the bottom.

Glucose bouillon agar:
Growth: Colorless, abundant, wrinkled.
Aerial mycelium: Abundant, white later Drab gray (Rdg. XLVI, 17'''''–d).
Soluble pigment: Prout's brown (Rdg. XV, 15'–m).
Reverse: Mummy brown (Rdg. XV, 17'–m).

Glucose bouillon broth:
Medium clear, Cinnamon buff (Rdg. XXIX, 17''–b).
Colorless growth sinks to the bottom.

Glucose Czapeck's agar: Same as on Czapeck's agar.

Glycerin Czapeck's agar: Same as on Czapeck's agar.

Glycerin bouillon agar:
Growth: Wrinkled, Buckthorn brown (Rdg. XV, 17'–i).
Aerial mycelium: None or scant, white.
Soluble pigment: Brown.

Egg media:
Growth: Colorless later Hair brown (Rdg. XLVI, 17'''''–i).
Aerial mycelium: None.

Yeast extract agar:
Growth: Wrinkled, Chamois (Rdg. XXX, 19''–b) to Buckthorn brown (Rdg. XV, 17'–i).
Aerial mycelium: Scant, Light grayish olive (Rdg. XLVI, 21''''–b).

Löffor's serum medium:
Growth: Colorless.
Aerial mycelium: None.
Soluble pigment: None.

Tyrosinate agar:
Growth: Colorless to faint brown.
Aerial mycelium: Light grayish olive (Rdg. XLVI, 21''''–b).
Soluble pigment: None.

Starch hydrolysis:
Growth: Hydrolysis=26 mm.:68 mm.
=25 mm.:65 mm.
Hydrolysis/growth =2.6—2.62.

Starch agar:
Growth: Colorless, thin, spreading.
Aerial mycelium: Scant, powdery, Pale drab gray (Rdg. XLVI, 17'''''–f).
Soluble pigment: None.
Reverse: Colorless.

Calcium malate agar:
  Growth: Thin, spreading, colorless later becoming Pale orange yellow (Rdg. III, 17–f).
  Aerial mycelium: Scant, white later becoming Pale drab gray (Rdg. XLVI, 17''''–f).
  Soluble pigment: None.
  Reverse: Colorless later becoming Pale orange yellow (Rdg. III, 17–f).
Gelatin: Fairly liquefaction. Liquefied portion coloring yellowish brown.
Cellulose: No growth.
Milk: Strong peptonization without coagulation.
Potato plug:
  Growth: Wrinkled, lichenoid, Pale orange yellow (Rdg. III, 17–f), later becoming Zinc orange (Rdg. XV, 13'–o).
  Aerial mycelium: Very abundant, white later becoming Drab gray (Rdg. XLVI, 17''''–d).
  Plug color is brown later becoming blackish brown.
Carrot plug:
  Growth: Fairly abundant, wrinkled, colorless later Zinc orange (Rdg. XV, 13'–o).
  Aerial mycelium: Fairly abundant, white later Drab gray (Rdg. XLVI, 17''''–d).
  Plug color is dark orange later.
Nitrate reduction: Nitrite strongly produced from nitrate.

(c) Carbon utilization observed by the Pridham's method:

| L-Arabinose ± | Inositol ± |
| Rhamnose +++ | Salicin +++ |
| D-fructose + | Sodium acetate + |
| D-galactose ++ | Sodium citrate ++ |
| Sucrose ± | Sodium succinate +++ |
| Maltose +++ | Erythritol ± |
| Lactose ++ | Mannose + |
| Raffinose +++ | D-xylose ++ |
| Inulin ± | Esculin ++ |
| D-mannitol ± | Dextrin +++ |
| D-sorbitol + | Control ± |
| Dulcitol ± | |

Remarks: ++++ very good growth; +++ good growth; ++ fairly good growth; + growth; ± growth doubtful; − no growth.

According to the description of Bergey's Manual of Determinative Bacteriology, 7th edition, published by the Williams and Wilkins Company, Baltimore, Md., U.S.A., in 1957, Strain No. 45449 seems to belong to a species resembling *Streptomyces flavogriseus* (Duché) Waksman. *Streptomyces flavogriseus*, however, has long straight hyphae producing a few curling tips, while the Strain No. 45449 has spiral hyphae. As an antibiotic bearing resemblance to zygomycin A, there has been reported hydroxymycin, which is produced by *Streptomyces paucisporogenes* (Annales Pharmaceutiques Francaises, vol. 16 (1958), p. 586). The microorganism, however, has no spiral hyphae, coagulates milk with peptonization, and does not reduce nitrate into nitrite, while Strain No. 45449 has spiral hyphae, peptonizes milk without coagulation, and strongly reduces nitrate into nitrite. These differences between Strain No. 45449 and the resembling microorganisms cited above show clearly that Strain No. 45449 belongs to a novel species. Hence, the present inventors have established a new species and named it *Streptomyces pulveraceus* nov. sp.

Strain No. 45449, like other various microorganisms belonging to Streptomyces, is liable to mutate its morphological properties or cultural characteristics. Such mutation may be caused naturally or artificially e.g. by ultraviolet- or X-ray irradiation and monospore separation. For example, a yellow mutant induced from Strain No. 45449 by irradiation with ultraviolet ray, has the morphological and culture characteristics as shown in the following. The symbol Rdg. has the same meaning as afore-mentioned.

(a) Morphological characteristics:
  Numerous spirals.
  Conidia spherical to ellipsoidal.
(b) Culture characteristics:
  Czapeck's agar:
    Growth: Colorless to Light Ochraceaus salmon (Rdg. XV, 13'–d), penetrate into medium.
    Aerial mycelium: Powdery, Light Buff (Rdg. 17'–f).
    Soluble pigment: None.
  Glucose Czapeck's agar:
    Growth: Colorless to Light Ochraceous salmon (Rdg. XV, 13'–d), penetrate into medium.
    Aerial mycelium: Powdery, Tilleul buff (Rdg. XL. 17'''–f) to Light Buff (Rdg. XV, 17'–f).
    Soluble pigment: None.
  Glycerin Czapeck's agar:
    Growth: Colorless to Light ochraceous salmon (Rdg. XV, 13'–d), penetrate into medium.
    Aerial mycelium: Powdery, Light Buff (Rdg. XV, 17'–f) to Buff yellow (Rdg. IV, 19–d).
    Soluble pigment: None.
  Glucose asparagine agar:
    Growth: Ochraceous orange (Rdg. XV, 15'), penetrate into medium.
    Aerial mycelium: Powdery, Pale yellow orange (Rdg. III, 15–f).
    Soluble pigment: None, later becoming faint brown.
  Nutrient agar:
    Growth: Colorless.
    Aerial mycelium: None.
    Soluble pigment: None.
  Glucose nutrient agar:
    Growth: Colorless, folded.
    Aerial mycelium: None.
    Soluble pigment: None or faint brown.
  Glycerin nutrient agar:
    Growth: Ochraceous buff (Rdg. XV, 15'–b).
    Aerial mycelium: None.
    Soluble pigment: Buckthorn brown (Rdg. XV, 17'–i).
  Glucose broth:
    Growth: Colorless sediment.
    Aerial mycelium: None.
    Soluble pigment: None.
  Starch agar:
    Growth: Faint, colorless.
    Aerial mycelium: None.
    Soluble pigment: None.
  Egg:
    Growth: Colorless, wrinkled.
    Aerial mycelium: None.
    Soluble pigment: None.
  Yeast extract agar:
    Growth: Orange (Rdg. III, 15), folded, penetrate into medium.
    Aerial mycelium: Scant, white to Light buff (Rdg. XV, 17'–f).
    Soluble pigment: None.
  Potato plug:
    Growth: Orange (Rdg. III, 15).
    Aerial mycelium: White to Light buff (Rdg. XV, 17'–f), plug is blackened.
  Carrot plug:
    Growth: Colorless colonies.
    Aerial mycelium: White to Light Buff (Rdg. XV, 17'–f), plug is faint brown.

Milk medium:
    Growth: Colorless ring.
    No coagulation. Peptonization.
    Soluble pigment: Yellowish brown.
Gelatin:
    Growth: Colorless, Liquefaction (8–9 mm.:45 mm.).
    Soluble pigment: None.
Nitrate reduction: Reduction strong.
Serum:
    Growth: Colorless.
    Aerial mycelium: None.
    Soluble pigment: None.
Cellulose: No growth.
Calcium malate agar:
    Growth: Apricot yellow (Rdg. IV, 19–b), penetrate into medium.
    Aerial mycelium: White.
    Soluble pigment: None.
Tyrosinate agar:
    Growth: Apricot buff (Rdg. XIV, 11'–b), faint.
    Aerial mycelium: Scant, white.
    Soluble pigment: None.
Starch hydrolysis: Growth — Hydrolysis = 12 mm.:34 mm.

(c) Carbon utilization: As same as that of the original Strain No. 45449.

Other mutants or variants of *Streptomyces pulveraceus* nov. sp. are also usable for the purpose of this invention so long as they produce one or more of zygomycin A, zygomycin B, zygomycin C and zygomycin D.

The antimicrobial spectrum of Strain No. 45449 was measured by the cross-streak method, and the following result was obtained.

| Test microorganism | Inhibition length (in millimeter) | |
| --- | --- | --- |
| | Bouillon agar | Glycerin bouillon agar |
| *Escherichia coli* | 28 | 18 |
| *Proteus vulgaris* | 25 | 17 |
| *Micrococcus pyogenes* var. *aureus* | 28 | 20 |
| *Bacillus subtilis* | 50 | 30 |
| *Bacillus cereus* | 24 | 20 |
| *Mycobacterium* ATCC-607 | 28 | 21 |
| *Mycobacterium tuberculosis* var. *avium* | 28 | 21 |
| *Mycobacterium tuberculosis* var. *avium* (streptomycin-resistant strain) | 30 | 20 |

Specimens of Strain No. 45449 and of its yellow mutant mentioned above were deposited at Institute for Fermentation, Osaka, Japan, as well as at American Type Culture Collection, Washington, D.C., U.S.A. The respective accession numbers of the former are IFO-3855 and ATCC-13875, and those of the latter IFO-3857 and ATCC-13877.

To incubate a strain of *Streptomyces pulveraceus*, there is preferably employed a liquid medium, comprising inter alia assimilable carbon sources, digestive nitrogen sources. The carbon sources are, for example, starch, glucose, lactose, maltose, dextrin, glycerin and millet jelly, and the nitrogen source, for example, peptone, soy bean meal, cornsteep liquor, meat extract, rice bran, wheat bran, urea and ammonium salts. Further, some inorganic salts such as common salt, phosphates, calcium salts, zinc salts, manganese salts and iron salts may be added to the medium. If desired or necessary, a trace element or trace elements may be added as growth accelerator, and an animal or vegetable or mineral oil as an anti-foaming agent may further be added.

The incubation medium may be solid or liquid, but a liquid medium is more suitable for an industrial production of zygomycins.

Incubation of *Streptomyces pulveraceus* on a liquid medium containing the above nutrient sources is preferably conducted with agitation and aeration, or with shaking if required. The incubation conditions, as the case may be, are selected so as to be most suitable for growing the microorganism used and to obtain the desired antibiotic or antibiotics in a yield as good as possible. When Strain No. 45449 or its yellow mutant mentioned above is employed as zygomycin-producing microorganism [zygomycin A and zygomycin B are hereinafter inclusively referred to as "zygomycin (basic components)" unless otherwise particularly mentioned], the strain is preferably incubated by the so-called submerged culture, for example, at about 26 to 30° C., at around neutral pH, for about 2 to 5 days.

The incubation broth thus obtained contains several antibiotics. These antibiotics are basic, neutral and acid substances, and the basic substance may be divided at least into two groups which are different from each other in property. In this basic substance, both zygomycin A and zygomycin B are contained. Zygomycin A and zygomycin B, being basic, can form salts with inorganic and organic acids. Zygomycin (basic components) is separable in free state or as salts from the incubation broth utilizing its physical and/or chemical properties. As the greater part of the basic antibiotics are contained in the liquid part of the incubation broth, their loss is very small even when zygomycin (basic components) is collected only from the filtrate of the incubation broth. Zygomycin (basic components) can be separated from the incubation broth or its filtrate utilizing difference between zygomycin (basic components) and impurities in adsorbability on an adsorbent. For example, the liquid material containing zygomycin (basic components) is passed through a layer of an absorbent or it is agitated with an absorbent to adsorb zygomycin (basic components). The zygomycin (basic components) adsorbed on the adsorbent can be eluted with a suitable solvent. One of the most suitable absorbents for this purpose is activated charcoal, and one of the most suitable solvents is an aqueous lower fatty alcohol. The adsorption of zygomycin (basic components) on activated charcoal may easily be effected at an alkaline pH, and the elution may preferably be effected at an acid pH. Zygomycin (basic components) may be purified using ion exchange resin such as the ammonium or alkali metal salt form of a weakly acid resin whose ion exchange radical is carboxylic acid. Such an ion exchange resin is available from, for example, Rohm & Haas Co., U.S.A., under the trade name of Amberlite IRC-50. The resin is polymer bead acrylic type resin having a carboxylic group as the exchange radical. Elution of zygomycin (basic components) from such an adsorbent may preferably be effected by means of an aqueous solvent.

Another purification process of zygomycin (basic components) consists in that an aqueous solution containing the components and a strongly acid surface active agent is extracted with an organic solvent which readily dissolves the components. The surface active agent is 7-ethyl-2-methyl-4-hendecanol sulfate sodium salt, triethanolamine salt of tetradecyl sulfonic acid, 3,9-diethyl-tridecyl-6-sulfate, sodium salt of a sulfonated petroleum hydrocarbon ($C_{10}$) or sodium dioctyl sulfosuccinate, for instance, and the organic solvent is amyl alcohols or butyl alcohols, for example. The salt of zygomycin (basic components) with the surface active agent contained in the extract can be liberated by neutralization.

As the salt of zygomycin (basic components) with a surface active agent is generally hardly soluble in water, it can be precipitated from a considerably concentrated aqueous solution of zygomycin (basic components) by the addition of the surface active agent. From this precipitate can be separated the desired antibiotics.

As another method for the purification, a water miscible organic solvent is added to an aqueous solution of an inorganic acid addition salt of zygomycin (basic components) to precipitate the salt. Organic acid addition salts of zygomycin (basic components) are in general soluble in organic sol solvents, and therefore this purification process is inapplicable to such organic acid addition salts.

Or, other processes suitable for isolating basic antibiotics from an incubation broth of a microorganism may all be applicable to the isolation of zygomycin (basic components) from the incubation broth of *Streptomyces pulveraceus*. These purification processes may be applied separately or in combination or repeatedly.

Zygomycin (basic components) obtained by the above processes is mainly composed of zygomycin A and zygomycin B, but contains some impurities. For separating zygomycin (basic components) into zygomycin A and zygomycin B, there may be employed such a process as adsorption or partition or ion-exchange chromatography or counter-current distribution. As the adsorbent or hanger in chromatography, activated charcoal, activated alumina, magnesium silicate, silica gel, etc. may be employed. As the developer in adsorption chromatography, water or aqueous methanol is preferably employed. When activated charcoal is used as the adsorbent, water is the most preferable developer, and 80% aqueous methanol is most suitable when activated alumina is employed as the adsorbent, for instance. And, a mixture composed of phenol and water or of acetic acid, normal butanol and water is preferably usable as developer for the partition chromatography. The ratio of the components of the latter mixture may for example be 2:1:2. Or, the upper layer of such a mixture in which the ratio is e.g. 4:1:5 may also give preferable results.

The above mentioned purification of crude zygomycin (basic components) give at least two kinds of basic antibiotics or their salts, one of which has a cross resistance with neomycin, and the other with streptomycin. The former basic antibiotic is called zygomycin A, and the latter zycomycin B.

The ratio in quantity of zygomycin A to zygomycin B varies with the kinds of the microorganism used, the components of the medium employed for the incubation, incubation conditions, etc. For example, when Strain No. 45449 is incubated on a medium composed of glucose (2%), lactose (1%), soy bean meal (3%), polypeptone (0.5%) and calcium carbonate (0.5%), zygomycin A is chiefly produced, repressing the production of zygomycin B, but when 0.3% to 0.5% of sodium chloride is added to the above medium, the production of zygomycin B is remarkably increased.

Zygomycin (basic components) occurs as a colorless basic powdery substance, and the hydrochloride or sulfate thereof is a slightly hygroscopic powder and is easily soluble in water. Zygomycin (basic components) hydrochloride is soluble in methanol and hardly soluble in non-polar solvents such as acetone.

Zygomycin A is positive to ninhydrin reaction, but negative to Sakaguchi, Elson-Morgan, benzidin and maltol reactions, and does not reduce Fehling solution. Specific rotation of zygomycin A is $[\alpha]_D^{21} = +83°$ (c., 2, $H_2O$). Ultraviolet absorption spectrum of zygomycin A hydrochloride has no characteristic absorption between 220 m$\mu$ and 340 m$\mu$. Infrared absorption spectra of zygomycin A hydrochloride and its N-benzoate observed with a spectrophotometer with NaCl prism by KBr disc method, have the under-mentioned adsorption bands (FIG. 1 and 2, respectively).

Zygomycin A hydrochloride: 2.95, 3.2–3.45, 4.25, 5.00, 5.95, 6.25, 6.65, 7.25, 8.80, 9.85, 10.55–10.80, 13.00$\mu$.

Zygomycin A N-benzoate: 2.95, 3.42, 6.08, 6.54, 6.72, 7.65, 9.65$\mu$.

Zygomycin A N-benzoate is a crystalline substance melting at 206° C. with decomposition, and its elementary analysis gave the under mentioned results (the analysis was repeated five times).

|     | C percent | H percent | N percent |
| --- | --- | --- | --- |
| i   | 58.14 | 6.04 | 5.71 |
| ii  | 58.58 | 5.97 | 5.51 |
| iii | 58.96 | 6.00 | 5.91 |
| iv  | 59.02 | 5.89 | 5.58 |
| v   | 58.30 | 6.13 | 5.73 |

And, qualitative analysis of the N-benzoate shows that any of sulfur, phosphor and halogen is not contained therein. The empirical formula of the N-benzoate is thus presumed as $C_{23}H_{40}N_5O_{14}(C_6H_5CO)_5 \cdot 3H_2O$.

Fairly pure zygomycin B can form hydrochloride. The hydrochloride is negative to ninhydrin reaction and positive to Sakaguchi reaction. The specific rotation of zygomycin B contaminated with a slight quantity of zygomycin A is $[\alpha]_D^{23} = +2°$ (c., 1, $H_2O$).

Zygomycin B can further be purified as its sulfate. The purified zygomycin B sulfate is positive to Sakaguchi reaction and negative to Elson-Morgan and Maltol reactions. The specific rotation of zygomycin B sulfate is $[\alpha]_D^{23} = -84°$ (c., 1.0, $H_2O$). Ultraviolet absorption spectrum of the sulfate has no characteristic absorption, and infrared absorption spectrum observed with a spectrophotometer with NaCl prism by KBr-disc method has as shown in FIGURE 3, the under mentioned absorption bands.

3.00, 6.05, 6.15, 6.85, 7.40, 9.25, 10.10, 10.30, 11.50$\mu$

The crystalline zygomycin B sulfate shows no definite melting point, and gives the following value in elementary analysis.

C, 34.29%; H, 6.3%; N, 12.06%

Judging from the infrared spectrum of its sulfate, zygomycin B is presumed to be an antibiotic belonging to the same series as streptomycin, since the spectrum has almost the same character as that of streptomycin sulfate. But, streptomycin and hydroxystreptomycin differ from zygomycin B in color reaction. Dihydrodesoxystreptomycin is also distinguished from zygomycin B by mixed melting point determination, by the fact that the sulfate of the former is uncrystallizable, and by difference in the X-ray diffraction pattern of their free bases and sulfate purified by the same method. Hence, it is obvious that zygomycin B is a new antibiotic bearing a considerable resemblance to streptomycin, dihydrodesoxystreptomycin, hydroxystreptomycin and dihydrostreptomycin.

Paper partition chromatography of zygomycin hydrochloride (zygomycin A hydrochloride plus zygomycin B hydrochloride) is carried out using a filter paper strip (Toyo-Roshi No. 131) by descending method, developing with 50% aqueous phenol for 44 hours. The chromatographic pattern of the antibiotics are observed from bioautography, ninhydrin and Sakaguchi reactions. As to zygomycin A, the ninhydrin positive pattern as well as an inhibition pattern against *Bacillus subtilis* were observed at about 4 centimeters from the origin. On the other hand, as to zygomycin B, the Sakaguchi reaction positive pattern as well as an inhibition pattern against *Bacillus subtilis* were observed at about 14 centimeters from the origin.

The antimicrobial spectrum of zygomycin A sulfate was compared with that of zygomycin B sulfate, and at the same time, antimicrobial spectrum of zygomycin B sulfate was also compared with those of the sulfates of kanamycin, neomycin and streptomycin, which are regarded as antibiotics resembling zygomycin B, by agar dilution method, and their minimum concentrations for inhibiting the growth of test microorganisms in microgram per milliliter were observed.

| Test microorganism | Minimum concentration for inhibition of the growth | | | | |
|---|---|---|---|---|---|
| | Zygomycin A sulfate | Zygomycin B sulfate | Streptomycin sulfate | Kanamycin sulfate | Neomycin sulfate |
| Escherichia coli | 10 | 5–10 | 5 | 5 | 5 |
| Proteus vulgaris | 20 | 50 | 5 | 10 | 10 |
| Pseudomonas aeruginosa | >100 | 100 | 10 | >100 | >100 |
| Micrococcus pyogenes var. aureus | 5 | 5 | 1 | 5 | 5 |
| Bacillus subtilis | 0.5 | 1 | 0.2–0.5 | 0.25 | 0.2 |
| Bacillus cereus | 2.5 | 2 | 1–2 | 1.7 | 1 |
| Bacillus brevis | 50 | 100 | | 25 | 5 |
| Micrococcus flavus | 100 | 2 | 2 | 17 | 5 |
| Sarcina lutea | 25 | 5 | | 25 | 10 |
| Serratia marcescens | 5 | 5 | | 5 | 5 |
| Mycobacterium tuberculosis var. avium (sensitive) | 2 | 1–2 | 1 | 1.1 | 2 |
| Mycobacterium tuberculosis var. avium (streptomycin resistant) | 2 | >100 | >100 | 1.25 | 2 |
| Mycobacterium tuberculosis var. avium (neomycin resistant) | >100 | 1–2 | | >100 | >100 |
| Mycobacterium ATCC-607 | 2 | 1–2 | 1 | 1.1 | 2 |
| Mycobacterium phlei | 2.5 | 1–2 | | 12.5 | 1 |
| Mycobacterium smegmatis | 2.5 | 1–2 | | 2.5 | 1 |

From this table, it is obvious that the spectra of both zygomycin A and zygomycin B are different from any of those of kanamycin, neomycin and streptomycin. The minimum concentrations of zygomycin A for inhibiting the growth of various pathogenic microorganisms were found as under by the agar dilution method:

| Microorganism | Number of strain | Minimum concentration for inhibiting the growth (micrograms per milliliter) |
|---|---|---|
| Micrococcus pyogenes var. aureus | 3 | 2.0–8.0 |
| Streptococcus haemolyticus | 5 | 12.5–25.0 |
| Streptococcus viridans | 1 | 50.0 |
| Diplococcus pneumoniae | 3 | 25.0–50.0 |
| Salmonella typhi | 4 | 4.0–8.0 |
| Salmonella paratyphi | 4 | 2.0–16.0 |
| Salmonella enteritidis | 1 | 16.0 |
| Salmonella senftenberg | 1 | 8.0 |
| Shigella dysenteriae | 1 | 16.0 |
| Shigella flexneri | 3 | 16.0 |
| Shigella sonnei | 1 | 16.0 |
| Klebsiella pneumoniae | 1 | 2.0 |
| Cerynebacterium diphtheriae | 1 | 2.0 |
| Microbacterium tuberculosis var. hominis (H37Rv) | 1 | [1] 2.5–10.0 |
| Vibrio cholerae | 5 | 16.0–32.0 |
| Neisseria gonorrhoeae | 1 | 32.0 |
| Micrococcus pyogenes var. aureus (penicillin, streptomycin, chloramphenicol and tetracycline resistant strain) | 1 | 16.0 |
| Micrococcus pyogenes var. aureus (penicillin, chloramphenicol and tetracycline resistant strain) | 1 | 8.0 |
| Micrococcus pyogenes var. aureus (penicillin, streptomycin and tetracycline resistant strain) | 1 | 8.0 |
| Streptomycin, chloramphenicol and tetracycline resistant shigella species | 4 | 16.0 |

[1] 10.0 micrograms per milliliter on Kirchner's medium, and 2.5 micrograms per milliliter on Dubos' medium.

When zygomycin A hydrochloride is heated together with normal hydrochloric acid for 4 hours, it becomes inactive against Bacillus subtilis and Mycrococcus pyogenes var. aureus, as shown by the antibiotic spectrum obtained by "cup method." The respective stabilities of zygomycin A hydrochloride at acid, neutral and alkaline conditions are examined to find the results shown in the following table.

| | pH 2.0 | | | | pH 7.0 | | | | pH 9.0 | | | |
|---|---|---|---|---|---|---|---|---|---|---|---|---|
| | C | P | S | B | C | P | S | B | C | P | S | B |
| Control | | | | | 50 | 35 | 50 | 500 | | | | |
| 100° C., 30 minutes | 35 | 15 | 35 | 500 | 50 | 35 | 75 | 500 | 50 | 35 | 50 | 500 |
| 100° C., 60 minutes | 50 | 15 | 50 | 500 | 35 | 15 | 35 | 500 | 50 | 35 | 50 | 500 |

NOTE.—C, Escherichia coli; P, Proteus vulgaris; S, Mycrococcus pyogenes var. aureus; B, Bacillus subtilis.

In the above table, the units against each test microorganism were calculated by dilution method. From these data, it is clear that zygomycin A is quite stable at least under the above mentioned conditions.

The antimicrobial activity of zygomycin A against pathogenic microorganisms in vivo revealed that life-span of mice infected with Mycobacterium tuberculosis var. hominis is much prolonged by subcutaneous injections of 0.4 milligram per day per animal of zygomycin A hydrochloride, and that mice infected with a fatal dose of a penicillin, streptomycin and tetracycline-resistant strain of Micrococcus pyogenes var. aureus survive by the subcutaneous injections of zygomycin A hydrochloride.

The respective toxicities of zygomycin A hydrochloride and zygomycin B sulfate were observed on 4 weeks old male mice (strain dd) by intravenous injection.

Zygomycin A hydrochloride: $LD_{50}=230$ milligrams per kilogram

Zygomycin B sulfate: $LD_{50}=330$ milligrams per kilogram

And, any delayed toxicity was not found in either of them. Further, increase of the body weight was observed in mice, while no toxicosis was observed when 100 milligrams of zygomycin A hydrochloride per day per kilogram is subcutaneously injected for 21 days. Consequently, it was recognized that zygomycin A hydrochloride does not show any subacute toxicity.

Zygomycin A can be regarded as an antibiotic bearing resemblance to neomycin (Science, vol. 109 (1949), p. 305), kanamycin (Journal of Antibiotics, Japan, Series A, vol. 10 (1957), p. 107), hydroxymycin (Annales pharmaceutiques francaises, vol. 16 (1958), p. 585), paromomycin (Japanese patent publication 6649/1958, Belgian Patent 547,976, U.S. Patent 2,916,485) and framycetin (Annales pharmaceutiques francaises, vol. 11 (1953), p. 44). Among them, hydroxymycin and paromomycin most closely resemble zygomycin A in many respects. But, the antimicrobial spectrum of zygomycin A is far different from that of hydroxymycin, as shown in the following.

| Microorganism* | Minimum concentration for inhibiting the growth in micrograms per milliliter | |
|---|---|---|
| | Hydroxymycin | Zygomycin A |
| Micrococcus pyogenes var. aureus* (1) | 0.4 | 5 |
| Bacillus subtilis ATCC 6633 | 0.2 | 0.5 |
| Bacillus cereus* (2) | 1.2 | 2 |
| Bacillus mycoides* (3) | 1.5 | 1 |
| Sarcina lutea* (4) | 1.6 | 25 |
| Aerobacter aerogenes* (5) | 3.5 | 10–20 |
| Eschericia coli ATCC 9637 | 4 | 20 |
| Pseudomonas aeruginosa* (6) | 30 | 200–1,000 |
| Serratia marcescens ATCC 9986 | 3.5 | 20 |

In the above table, antimicrobial spectrum of zygomycin A observed on microorganisms marked with asterisk was obtained by using different strains from those shown in the description of hydroxymycin supra, and the respective strains used are as follows:

| Species | Hydroxymycin | Zygomycin A |
|---|---|---|
| (1) | Oxford | 209 P. |
| (2) | NRRL-B569 | ATCC-10702. |
| (3) | No description | IFO-3015. |
| (4) | ATCC-9341 | IFO-3232. |
| (5) | No description | Mean value on 11 strains. |
| (6) | ____do____ | Mean value on 15 strains. |

As is clear from the above table, the antimicrobial spectrum of zygomycin A is different from that of hydroxymycin especially on *Micrococcus pyogenes* var. *aureus, Sarcina lutea, Eschericia coli, Serratia marcescens* and *Pseudomonas aeruginosa*. Though color reactions of zygomycin A and hydroxymycin resemble each other (positive to ninhydrin reaction and negative to Elson-Morgan's reaction), their molecular formulate and R$f$ values on paper chromatogram, etc. are quite different as shown in the following table.

| | Zygomycin A | Hydroxymycin |
|---|---|---|
| Molecular formula | $C_{23}H_{45}O_{14}N_5$ | $C_{25}H_{47}O_{15}N_5$. |
| R$f$ value on paper chromatogram developer, normal butanol/acetic acid/water: | | |
| 2:1:2 | 0.33 | |
| 4:1:5 | 0.01 | 0.01. |
| p-(p'-Hydroxyphenyl-azo)-benzenesulfonate: | | |
| M. P | Darkened at 190° C. Not decomposed even at 300° C. | 220° C. (decomp.). |
| [α]$_D$ | +34° | +37°. |
| N-pentabenzoate: | | |
| M. P | 206° C. (decomp.) | 232° C. (decomp.). |
| [α]$_D$ | +36° | +36°±2°. |
| λ$_{max}$ | 228 mμ ($E^{1\%}_{1cm}$ 460) | 227 mμ ($E^{1\%}_{1cm}$ 459). |

Zygomycin A is thus concluded as a new antibiotic different from hydroxymycin, though they bear considerable resemblance to each other.

On the other hand, it was also clarified that zygomycin A has a different chemical structure from that of paromomcin judging from the description on the chemical structure of paromomycin (Journal of the American Chemical Society, vol. 81 (1959), pp. 3480–3483; in the descriptions hereinafter appearing on the physical constant, etc. of paromomycin or its derivatives or their decomposition products are all quoted from this journal).

In the same manner as in the production of paromamine from paromomycin (Journal of the American Chemical Society supra), a decomposition product of zygomycin A having the following properties can be obtained.

Melting point 232° C. (with decomposition)
[α]$_D^{22}$ +83° (c., 0.5, H$_2$O)

*Analysis.*—Calcd. for $C_{12}H_{25}N_3O_7 \cdot 3HCl \cdot H_2O$: C, 31.97%; H, 6.71%; N, 9.32%. Found: C, 32.15%; H, 6.65%; N, 9.28%.

The free base of the above product has the following properties.

Melting point 250–251° C. (with decomposition)
[α]$_D^{22}$+124° (c., 1, H$_2$O)

*Analysis.*—Calcd. for $C_{12}H_{25}N_3O_7 \cdot \frac{1}{2}H_2O$: C, 43.36%; H, 9.88%; N, 12.64%. Found: C, 43.69%; H, 8.13%; N, 12.93%.

Upon comparing these values with those in the description on the decomposition product of paromomycin, it can be presumed that this product is the same as the paromamine obtained from paromomycin.

Two kinds of crystals are separated from a product obtained by decomposing the above compound $$(C_{12}H_{25}N_3O_7 \cdot \frac{1}{2}H_2O)$$

by boiling with 6 normal hydrochloric acid. One of them is confirmed to be 1,3-diamino-4,5,6-trihydroxy-cyclohexane hydrochloride (melting at 315° C. with decomposition, colorless crystals). The other occurs as colorless crystals melting at 288–289° C. with decomposition, and is identified with an authentic specimen of D-glucosamine. From the above results as well as the study on the oxidation product of the compound of $$C_{12}H_{25}N_3O_7 \cdot H_2O$$

obtained by treating with periodic acid, $C_{12}H_{25}N_3O_7$ is identified with paromamine described in the Journal of the American Chemical Society supra.

To the mother liquor from the paromamine produced from zygomycin A, ether is added to obtain a precipitate.

A solution of this precipitate in a mixture of methanol and ether (2:1) is passed through a tower packed with alumina, then the substance adsorbed is eluted with methanol/ether (5:2). After concentrating the eluate, ether is added thereto, whereupon a hygroscopic colorless powder precipitates out, [α]$_D^{21}$ +29° (c., 1, H$_2$O). This is regarded from its pattern of paper chromatogram as a compound having the empirical formula $$C_{11}H_{22}N_2O_8(OCH_3)$$

which is a kind of methylglycoside. This methylglycoside is tentatively called methyl zygobiosaminide. From the paper chromatogram of the hydrolyzate of methyl zygobiosaminide, its components are presumed to be ribose and an amino sugar.

A solution of methyl zygobiosaminide in 6 normal hydrochloric acid is refluxed for 1.5 hours and concentrated to dryness under reduced pressure. The residue is purified by chromatography on sulfonated polystyrene bead resin to obtain a very hydroscopic powder. The product is further purified by active carbon chromatography to obtain a very hygroscopic crystalline powder, [α]$_D^{22}$ +24° (c., 1, H$_2$O). Picrate of the product occurs as crystals having melting point of 126–127° C. with decomposition, [α]$_D^{23}$ +9.4° (c., 0.5, H$_2$O). On the other hand, the picrate of a decomposition product of paromomycin corresponding to this product (paromose picrate) occurs as crystals M.P. 126–128° C. (decomposition, [α]$_D^{28}$ +22° (c., 0.5, H$_2$O). This product is regarded as a diaminohexose from the analytical data of N,N'-diacetyl dihydrozygose to be described later, and tentatively named zygose.

Zygose thus obtained is acetylated by the method described in the Journal of the American Chemical Society, vol. 76 (1954), p. 301, and ibid., vol. 81 (1959), p. 3481, to obtain N,N'-diacetylzygose. p-Nitrophenyl-hydrazone of zybose melts at 215–217° C. with decomposition and shows [α]$_D^{24}$ +92° (c., 0.04, 50% methanol), while N,N'-diacetylparomose obtained by the same route from paromose melts at 229–231° C. with decomposition and exhibits [α]$_D^{25}$ +5.9° (c., 0.4, moist methanol).

N'N-diacetylzygose is reduced by a method similar to that given in the Journal of the American Chemical Society, vol. 73 (1951), p. 4691, ibid., vol. 76 (1954), p. 4887, and ibid., vol. 81 (1959), p. 3481, to obtain a colorless powder. The powder is crystallized from a mixture of methanol and acetone. The product, colorless needles, blackens at 210 to 230° C., and decomposes at 260° C. under foaming.

*Analysis.*—Calcd. for $C_{10}H_{20}O_6N_2$: C, 45.45%; H, 7.63%; N, 10.60%. Found: (i) C, 45.79%; H, 7.51%; N, 10.20%; (ii) C, 45.88%; H, 7.56%.

[α]$_D^{20}$ +49° (c., 1, H$_2$O); +48° (c., 1, 0.2 mol. pH 4.4 acetate buffer).

The reduction product of N,N'-diacetylparomose obtained by the same manner as above from paromomycin shows [α]$_D^{28}$ −17.8° (c., 4.0, 0.2 mol. pH 4.5 acetic acid buffer), M.P. 150.5–154.5° C. Thus, it is clear that zygose is a diaminohexose different from known paromose.

As is described in the foregoing, the existence of ribose in the hydrolyzate of zygomycin A has been presumed by paper partition chromatography, and the ribose has now been found to be actually obtainable. Namely, crude methyl zygobiosaminide is N-acetylated, then boiled with dilute sulfuric acid. After removing the sulfuric acid, the resultant is passed through weakly basic anion exchange resin (OH⁻ type), and carboxylic acid cation exchange resin (H⁺ type), successively. The effluent is subjected to chromatography on activated charcoal, and the eluate thus obtained is concentrated to dryness to obtain a colorless resinous substance. The product crystallizes when it is allowed to stand overnight in a refrigerator as a solution in ethanol. Infrared absorption spectrum of this product is in good accord with that of ribose. And specific rotation moves from −14° to −17° C. in 24 hours. The product is thus confirmed as ribose.

As described before, zygomycin A is easily converted by methanolysis into paromamine and methyl zygobiosaminide, and the latter is easily converted by a diluted acid into zygobiosamine which is a free disaccharide. Therefore, zygobiosamine is presumed to be diaminohexosyl ribose, and the planar structure of zygomycin A is considered to be as under:

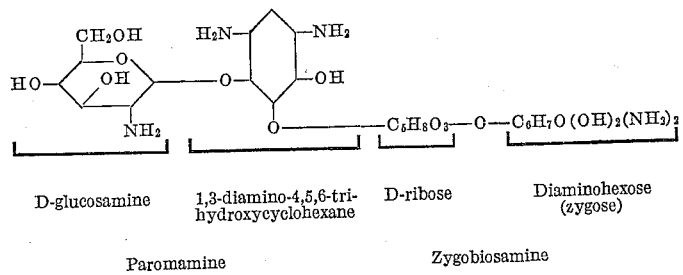

| D-glucosamine | 1,3-diamino-4,5,6-tri-hydroxycyclohexane | D-ribose | Diaminohexose (zygose) |

Paromamine     Zygobiosamine

As described before, it is clarified that zygomycin (basic components) and its two components (zygomycin A and zygomycin B) are different from known antibiotics in properties and/or chemical structure, and moreover they are all applicable to therapeutic uses for treating microbial infections on clinical fields. The subject matter of this invention is believed to be new and useful antibiotics.

The following examples serve merely as illustrative of features of the procedure in this invention and have no meaning of limitation or restriction of the presently discussed invention. In these examples, percents are in weight percent, except otherwise noted, temperatures are all uncorrected, and abbreviations "kg.", "g.", "mg.", "mcg.", "l.", "ml.", and "cm." mean kilogram, gram, milligram, microgram, liter, milliliter and centimeter, respectively.

*Example 1*

In this example is employed an aqueous medium (pH 7.0) composed of 2.0% of glucose, 1.0% of lactose, 2.0% of soy bean powder, 0.5% of polypepton, 0.3% of sodium chloride and 0.5% of calcium carbonate.

A strain of *Streptomyces pulveraceus* (IFO-3855) is incubated on 50 ml. of the medium in a 200 ml.-flask at 28° C. for 2 days using a rotary shaker. Ten ml. of the above culture is, then, inoculated on 500 ml. of the medium in each of 2 l.-flasks, and is further incubated for 2 days at 28° C. using a reciprocal shaker. On 30 l. of the medium in a 50 l.-tank is inoculated the latter culture, and incubated at 28° C. for 24 hours to obtain a seed culture.

On 1000 l. of the medium in a 2000 l.-tank, the above seed culture is inoculated, 100 g. of silicon oil (anti-foaming agent) is added, and aerobic incubation is carried out under agitation (170 rounds per minute). Aeration is adjusted to 50% (by volume) for 35 hours from the start of the incubation, and to 100% (by volume) thereafter.

The pH of the broth and dilution unit against *Bacillus subtilis* after the respective periods are as shown in the following table.

| Incubation time (hours) | pH | Dilution unit (unit per ml.) |
|---|---|---|
| 0 | 7.38 | 0 |
| 17 | 7.92 | 10 |
| 30 | 8.02 | 75 |
| 41 | 8.25 | 150 |
| 54 | 8.12 | 350 |
| 65 | 7.84 | 350 |
| 78 | 8.28 | 750 |
| 89 | 8.32 | 750 |

*Example 2*

The incubation broth obtained in Example 1 (incubation time 78 hours) is filtered to obtain a filtered broth which inhibits the growth of *Bacillus subtilis* in a concentration of 75 times dilution. To 700 ml. of the filtered broth adjusted to pH 8.0–8.5 is added about 1% (to the volume of the broth) of activated charcoal, and the mixture is stirred for 30 minutes, when most of the active substances are adsorbed on the charcoal. The charcoal is washed with a little water, then is suspended in 140 ml. of 80% aqueous methanol. The suspension, after being adjusted to pH 2.0, is stirred for 20 minutes to elute the active substances. The methanolic solution (140 ml.) contains about 160 mcg./ml. of the active substances. A similar treatment to the above is repeated on the residual activated charcoal, giving 140 ml. of methanolic solution, in which the content of the active substances is 31 mcg./ml.

*Example 3*

To 1000 l. of an incubation broth obtained in a manner similar to that in Example 1 (incubated for about 80 hours) is added 8 kg. of diatomaceous earth (Hyflo Super-Cel) as a filter aid, and the broth is filtered to separate about 700 l. of a filtered broth which inhibits the growth of *Bacillus subtilis* in a concentration of 150-fold dilution. Calcium ions present in the filtrate are precipitated by the addition of 4 kg. of oxalic acid. The mixture is stirred with 5 kg. of diatomaceous earth, and filtered. The pH of the filtrate (about pH 2) is adjusted to 8.0 with 10% aqeous solution of sodium hydroxide, 100 g. of sodium ethylenediaminetetraacetate is added, and the mixture is passed, at a rate of 300 ml. per minute, through a tower (10 cm. in diameter, 80 cm. in height) packed with 5 l. of a cation exchange resin (carboxylic acid type, polymer bead acrylic type resin such as Amberlite IRC-50, Rohm and Haas Co., U.S.A.) which was previously made into a sodium form with sodium hydroxide to make it adsorb the active components. After washing with water, the resin is eluted with 0.5 normal hydrochloric acid at a rate of 33 ml. per minute to obtain about 12 l. of an eluate containing the active components. This eluate is neutralized with a 10% aqueous solution of sodium hydroxide and filtered to remove the precipitate formed. The filtrate is concentrated under reduced pressure to obtain a solution containing 12.5 mg. per ml. of the active components.

*Example 4*

Inorganic matters deposited in the filtrate obtained in Example 3 are removed by filtration. Then the filtrate is concentrated to about 450 ml. to obtain a solution containing 50 mg. per ml. of active components. After bringing the pH of the concentrate to pH 5.0-6.5, the concentrate is passed at a rate of 700 ml. per hour as through a column (6.5 cm. in diameter, 75 cm. in height) packed with activated charcoal previously washed with distilled water. The active components adsorbed on the column are then eluted with distilled water at the same rate as above, separating impurities. Initial 2350 ml. of the eluate chiefly contains inorganic substances, and then zygomycin A and zygomycin B are eluted in this order.

The feature of the eluate is observed on each 350 ml.-fraction from the start. The results are as follows:

| Fraction No. | Volume ml. | Potency in eluate | Remarks |
|---|---|---|---|
| 1 | 2,350 | − | Inorganic substances. |
| 2 | 350 | − | |
| 3 | 350 | + | Zygomycin A. |
| 4 | 350 | + | Do. |
| 5 | 350 | ++ | Do. |
| 6 | 350 | ++ | Do. |
| 7 | 350 | + | Do. |
| 8 | 350 | + | Do. |
| 9 | 350 | + | Do. |
| 10 | 350 | + | |
| 11 | 350 | − | |
| 12 | 350 | + | Zygomycin B. |
| 13 | 350 | + | Do. |
| 14 | 350 | + | Do. |
| 15 | 350 | + | Do. |
| 16 | 350 | + | Do. |
| 17 | 350 | + | Do. |
| 18 | 350 | + | Do. |
| 19 | 350 | − | |
| 20 | 350 | − | |

The active component in fractions Nos. 3–9 is assumed to be zygomycin A, because it is negative to Sakaguchi reaction, and the active component of fractions Nos. 12–18 is regarded as zygomycin B, because it is positive to Sakaguchi reaction.

The fractions containing zygomycin A are gathered and concentrated. Then, acetone is added to precipitate crude zygomycin A whose yield is 18.0 g. after drying.

From the fractions containing zygomycin B, 6.75 g. of crude zygomycin B is obtained in the same manner as above.

*Example 5*

On the top of a column packed with 60 g. of cellulose powder (3 cm. in diameter, 28 cm. in length) is fed 100 mg. of the crude zygomycin B obtained in Example 4, and partition chromatography is carried out using a solvent system of phenol/water (1:1). To each 30 ml. portion of the effluent are added ether and a little portion of water, and the mixture is shaken to transfer the phenol remaining in the aqueous layer into the ether layer. On each of aqueous layers, antimicrobial activity is examined using three strains of *Mycobacterium tuberculosis* var. *avium*, one of which is a streptomycin-resistant strain, another is a neomycin-resistant strain, and the third is a streptomycin and neomycin-sensitive strain, and the following results are obtained.

| Fraction No. | Diameter of the Inhibition zone, mm. | | |
|---|---|---|---|
| | Streptomycin-resistant strain | Neomycin-resistant strain | Streptomycin and neomycin-sensitive strain |
| 1–3 | | | |
| 4 | | 33.0 | 31.5 |
| 5 | | 35.0 | 30.5 |
| 6 | | 32.0 | 30.0 |
| 7 | | 30.0 | 30.0 |
| 8 | | 29.0 | 27.0 |
| 9 | | 29.0 | 27.0 |
| 10 | | 29.0 | 27.0 |
| 11 | | 27.0 | 25.5 |
| 12 | | 25.0 | 25.0 |
| 13 | | 20.0 | 20.0 |
| 14 | | 18.5 | 18.0 |
| 15 | | 16.5 | 17.0 |
| 16 | | 17.0 | 15.0 |
| 17 | | 15.0 | 15.0 |
| 18 | | 15.0 | 14.2 |
| 19 | | 15.0 | 14.0 |
| 20 | | 11.5 | 11.2 |
| 21 | 13.0 | | 11.2 |
| 22 | 16.0 | | 13.0 |
| 23 | 23.0 | | 17.5 |
| 24 | 17.0 | | 11.5 |
| 25–30 | | | |

From the above table, crude zygomycin is found to contain two components, both of which are inactive against streptomycin-resistant strain and neomycin-resistant strain of Mycobacteriumtuberculosis var. avium. The fractions inactive against the former strain contain zygomcin A, because they are positive to ninhydrin reaction. And the fractions inactive against the latter strain contain zygomycin B, because they are positive to Sakaguchi reaction. Namely, the crude zygomycin B obtained in Example 4 still contains a little portion of zygomycin A.

*Example 6*

An aqueous solution of the crude zygomycin B which is obtained in Example 4 and which still contains a little portion of zygomycin A is passed through a tower containing a sodium (or ammonium) form weakly acid cation exchange resin (acrylic type, bead resin, carboxylic type such as Amberlite IRC-50, Rohm and Haas Co., U.S.A.). After washing with water, the resin is eluted with 3–5% equeous ammonia to elute zygomycin A solely. The resin is washed again with water and eluted further with 0.5 normal hydrochloric acid to elute zygomycin B. The latter eluate is concentrated under reduced pressure and subjected to chromatography as in Example 4 to obtain zygomycin B in the form of a white powder.

*Example 7*

One hundred liters of a filtered broth free from calcium ions obtained in the same manner as in Example 3 is brought into contact with 2 l. of an ammonium form weakly acidic cation exchange resin (acrylic type, bead resin, carboxylic type, such as Amberlite IRC-50, Rohm and Haas, Co., U.S.A.). After washing with water, the resin is eluted with 5% aqueous ammonia to elute zygomycin A solely. The eluate is adjusted to pH 5.0 to 6.5 with hydrochloric acid and chromatographed on activated charcoal as in Example 4 to obtain zygomycin A hydrochloride. The ion exchange resin is further eluted with aqueous ammonia, followed with 0.5 normal hydrochloric acid. The eluate is concentrated under reduced pressure and subjected to a chromatography on activated charcoal to obtain zygomycin B hydrochloride as a white powder.

*Example 8*

To a solution of 2.6 g. of zygomycin B hydrochloride, magnesium sulfate is added. Methanol is gradually added to the mixture under agitation at 50 to 60° C. to separate zygomycin B sulfate. This separation can be effected smoothly by seeding a small crystal of zygomycin B sulfate. Methanol is further added to complete the separation. After being left standing for several hours at room temperature, the crystals are washed with methanol and dried to obtain crstalline zygomycin B sulfate. A water soluble inorganic or organic sulfate such as zinc sulfate and dimethylamine sulfate may be employed instead of magnesium sulfate in this example to prepare crystalline zygomycin B sulfate.

*Example 9*

In a similar manner to that of Example 1, another strain of *Streptomyces pulveraceus* (IFO–3857) is employed. The incubation is conducted for about 80 hours to obtain a broth whose dilution unit against *Bacillus subtilis* is almost the same as that of the broth obtained in Example 1.

From the broth thus obtained can be collected zygomycin A and zygomycin B in the same manners as in Examples 2 to 8.

From the incubation broth of a strain of *Streptomyces pulveraceus*, other two kinds of antibiotically active substances are separated. One of them is present in the mycelium of the microorganism incubated, and is called zygomycin C. The other is also present in the mycelium as well as the filtered broth and is called zygomycin D.

Zygomycin C can be separable from the mycelium by extraction with a lower fatty alcohol such as methanol, because it is easily soluble in such a solvent. Zygomycin D in an aqueous solvent is movable into acetic acid esters, while other zygomycins are hardly movable. Therefore, zygomycin D can be separated from the filtered broth of the incubation broth of *Streytomyces pulveraceus* by extraction with such a solvent as ethyl acetate and butyl acetates. Purification of these components can be effected by a chromatographical process on activated charcoal in which the culture filtrate is passed through a column of activated charcoal, then column is eluted with such an organic solvent as acetone.

Properties of zygomycin C and zygomycin D are considerably different from those of zygomycin A and zygomycin B. As zygomycin C is active against mircoorganisms at an acid pH, it is regarded as a physiologically acid antibiotic. Zygomycin D is readily soluble in water or in organic solvents, and is a neutral antibiotic stable at an acid or neutral pH, though considerably unstable at an alkaline pH.

The following is an antimicrobial spectrum of zygomycin C which was observed by the agar dilution method.

| Microorganism: | Minimum concentration for inhibition of the growth (mcg./ml.) |
|---|---|
| *Escherichia coli* | >1,000 |
| *Proteus vulgaris* | >1,000 |
| *Mycrococcus pyogenes* var. *aureus* | 50 |
| *Bacillus subtilis* | 20 |
| *Bacillus cereus* | 20 |
| *Mycobacterium tuberculosis* var. *avium* | 1,000 |
| *Mycobacterium tuberculosis* var. *avium* (streptomycin-resistant strain) | 1,000 |
| *Mycobacterium tuberculosis* var. *avium* (neomycin-resistant strain) | 1,000 |

Although this spectrum was observed on crude zygomycin C, it is clear that this antibiotic is active against Gram-positive bacteria.

The antimicrobial spectrum of zygomycin D was observed by the agar dilution method, gaving the results shown in the following.

| Microorganism: | Minimum inhibitory concentration (mcg./ml.) |
|---|---|
| *Saccharomyces cerevisiae* | 0.06 |
| *Aspergillus niger* | 20 |
| *Penicillium crysogenum* | 2 |
| *Candida albicans* | 100 |

From this, it is clear that zygomycin D is active against yeasts, though the observation was carried out on crude zygomycin D.

*Example 10*

Eight hundred liters of the effluent obtained in Example 3, from which zygomycin A and zygomycin B have been separated by means of cation exchange resin, is adjusted to pH 8.0. The effluent is then extracted three times with one-third, one-sixth and one-sixth its volume of ethyl acetate, in this order. After dehydrating over anhydrous sodium sulfate, the combined extract is concontrated under reduced pressure at a low temperature to obtain 116 g. of a zygomycin D-containing deep brown resinous substance, which inhibits the growth of *Saccharomyces cerevisiae* at a concentration of 0.3 mcg. per milliliter.

A suspension of the resinous substance in 2 l. of 20% aqueous acetone is passed through a column (4 cm. in diameter, 45 cm. in height) packed with activated charcoal. The column is then developed with 80% aqueous acetone to collect fractions which inhibit the growth of yeasts. The combined fraction is concentrated under reduced pressure to obtain 50 g. of crude zygomycin D as a yellow resinous substance. This inhibits the growth of yeasts at a concentration of 0.06 mcg. per ml.

*Example 11*

A methanolic extract of 150 g. of the incubation broth (incubation 80 hours) obtained in Example 1 is concentrated under reduced pressure to obtain 1.43 g. of zygomycin C which inhibits the growth of *Bacillus subtilis* at a concentration of 20 mcg. per ml.

Having thus disclosed the invention, what is claimed is:

1. A process for preparing a member selected from the group consisting of zygomycin A, zygomycin B, zygomycin C, and zygomycin D, which comprises the steps of inoculating an aqueous nutrient-containing medium with *Streptomyces pulveraceus* nov. sp., and incubating the inoculated medium at a temperature in the neighbourhood of 20–30° C. under aerobic conditions.

2. A process for preparing a member selected from the group consisting of zygomycin A, zygomycin B, zygomycin C, and zygomycin D, which comprises the steps of inoculating an aqueous nutrient-containing medium with *Streptomyces pulveraceus* nov. sp., and incubating the inoculated medium at a temperature in the neighbourhood of 20–30° C. under aerobic conditions until substantial antimicrobial activity is imparted in said medium, and recovering the desired antibiotic from the incubation broth.

3. A process for preparing zygomycin A which is representable by the formula

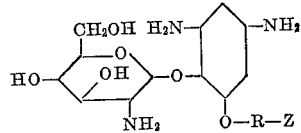

wherein O—R is the ribose radical and —Z is a diaminohexose radical, which comprises the steps of inoculating an aqueous nutrient-containing medium with *Streptomyces pulveraceus* nov. sp., and incubating the inoculated medium at a temperature in the neighbourhood of 20–30° C. aerobic conditions until substantial antimicrobial activity is imparted in said medium, and recovering the desired antbiotic from the incubation broth.

4. A process for preparing zygomycin B which is positive to Sakaguchi reaction negative to Elson-Morgan and Maltol reactions, showing $[\alpha]_D$ —84° (c., 1, $H_2O$) giving analytical value C about 34%. H about 6% and N about 12%, which comprises the steps of inoculating an aqueous nutrient-containing medium with *Streptomyces pulveraceus* nov., sp., and incubating the inoculated medium at a temperature in the neighbourhood of 20–30° C. under aerobic conditions until substantial antimicrobial activity is imparted in said medium, and recovering the desired antibiotic from the incubation broth.

5. A process for preparing zygomycin C which is active against gram-positive bacteria at an acidic pH, which comprises the steps of inoculating an aqueous nutrient-containing medium with *Streptomyces pulveraceus* nov. sp., and incubating the inoculated medium at a temperature in the neighbourhood of 20-30° C. under aerobic conditions until substantial antimicrobial activity is imparted in said medium, and recovering the desired antibiotic from the incubation broth.

6. A process for preparing zygomycin D which is active against yeasts, is soluble in water and in organic solvents, is considerably unstable at an alkaline pH and is stable at an acidic and neutral pH, which comprises the steps of inoculating an aqueous nutrient-containing medium with *Streptomyces pulveraceus* nov. sp., and incubating the inoculated medium at a temperature in the neighbourhood of 20-30° C. under aerobic conditions until substantial antimicrobial activity is imparted in said medium, and recovering the desired antibiotic from the incubation broth.

References Cited in the file of this patent

UNITED STATES PATENTS

| | | |
|---|---|---|
| 2,422,230 | Foster | June 7, 1947 |
| 2,446,102 | Peck | July 27, 1948 |
| 2,481,267 | Waiti | Sept. 6, 1949 |
| 2,483,892 | Ehrlich | Oct. 4, 1949 |
| 2,734,055 | Carrara | Feb. 7, 1956 |
| 2,736,725 | Ritter | Feb. 28, 1956 |
| 2,909,463 | De Boer | Oct. 20, 1959 |
| 2,909,464 | De Boer | Oct. 20, 1959 |